(12) United States Patent
Sako et al.

(10) Patent No.: US 7,711,776 B2
(45) Date of Patent: May 4, 2010

(54) DATA DISTRIBUTION SYSTEM, DATA DISTRIBUTION METHOD, SERVER, AND TERMINAL DEVICE

(75) Inventors: Yoichiro Sako, Tokyo (JP); Nobuyuki Idei, Tokyo (JP); Toshiro Terauchi, Tokyo (JP); Mitsuru Takehara, Tokyo (JP); Motoyuki Takai, Tokyo (JP)

(73) Assignee: Sony Corporation, Tokyo (JP)

( * ) Notice: Subject to any disclaimer, the term of this patent is extended or adjusted under 35 U.S.C. 154(b) by 783 days.

(21) Appl. No.: 11/489,064

(22) Filed: Jul. 19, 2006

(65) Prior Publication Data

US 2007/0038527 A1 Feb. 15, 2007

(30) Foreign Application Priority Data

Jul. 27, 2005 (JP) ............................. 2005-217808

(51) Int. Cl.
*G06F 15/16* (2006.01)
(52) U.S. Cl. ................... 709/205; 709/201; 709/203; 709/217; 709/219; 726/26; 726/27
(58) Field of Classification Search ......... 709/201–205, 709/217–219; 726/26–30
See application file for complete search history.

(56) References Cited

U.S. PATENT DOCUMENTS

| 5,640,320 | A  | * | 6/1997  | Jackson et al. ............... 700/87  |
| 5,978,840 | A  | * | 11/1999 | Nguyen et al. ............... 709/217 |
| 6,489,954 | B1 | * | 12/2002 | Powlette ...................... 709/217 |
| 7,167,896 | B2 | * | 1/2007  | Hasegawa et al. ........... 709/203 |
| 7,206,767 | B2 | * | 4/2007  | Matsushima et al. ......... 705/52 |
| 7,353,541 | B1 | * | 4/2008  | Ishibashi et al. ............. 726/26 |
| 7,401,151 | B2 | * | 7/2008  | Chatani ....................... 709/217 |
| 7,426,750 | B2 | * | 9/2008  | Cooper et al. ................ 726/26 |
| 2002/0188665 | A1 | | 12/2002 | Lash |
| 2003/0060157 | A1 | | 3/2003 | Henrick |
| 2009/0276634 | A1 | * | 11/2009 | Nomura ...................... 709/203 |

FOREIGN PATENT DOCUMENTS

| JP | 2002-123274 A | 4/2002 |
| JP | 2002-236768   | 8/2002 |
| JP | 2003-114949   | 4/2003 |
| JP | 2003-323375 A | 11/2003 |
| JP | 2004-192581 A | 7/2004 |
| JP | 2004-252575 A | 9/2004 |
| JP | 2004-362033 A | 12/2004 |
| JP | 2005-115453 A | 4/2005 |
| JP | 2006-107693   | 4/2006 |
| WO | WO 2005/057446 A | 6/2005 |

* cited by examiner

*Primary Examiner*—Bharat N Barot
(74) *Attorney, Agent, or Firm*—Randy J. Pritzker (57) ABSTRACT

The present invention provides a data distributing system for transmitting and receiving data between a terminal device and a server via a network. The server stores, for content data, additional data for modifying the content data or new content data obtained as a result of the modification of the content data and, in response to download and/or stream reproduction of the additional data and the new content data from the server by the terminal device, executes settlement processing and/or value point granting processing with respect to the additional data or the new content data.

15 Claims, 9 Drawing Sheets

DATA DISTRIBUTION SYSTEM, DATA DISTRIBUTION METHOD, SERVER, AND TERMINAL DEVICE

CROSS REFERENCES TO RELATED APPLICATIONS

The present invention contains subject matter related to Japanese Patent Application JP 2005-217808 filed in the Japanese Patent Office on Jul. 27, 2005, the entire contents of which being incorporated herein by reference.

BACKGROUND OF THE INVENTION

1. Filed of the Invention

The present invention relates to a data distributing system, a data distributing method, a server, and a terminal device for transmitting and receiving data between the server and the terminal device through a network.

2. Description of the Related Art

Recently, along with the popularization of digital AV equipment, so-called commercial content (including content for commercial use, content for sale, and professional content), such as music and video, are on the market in the form of CD and DVD (Digital Versatile Disk) and, at the same time, various kinds of content are marketed and distributed through networks. Further, along with the popularization of ADSL (Asymmetric Digital Subscriber Line) and FTTH (Fiber To The Home), P2P (Peer to Peer) systems based on the Internet have become reality.

As a related-art technology, Japanese Patent Laid-open No. 2002-236768, for example, discloses a content providing method and system, a content providing program, and a recording media storing the content providing program that are intended to minimize the unauthorized distribution of content and enhance user convenience.

Japanese Patent Laid-open No. 2003-114949 for example, discloses a data processing method and apparatus, a data access method, and a terminal device. In a system enabled for data transmission and reception between terminal device and server via a network, a file group is formed by a plurality of files managed by a server and the file group is labeled for each owner. If, in accessing a file, the file is contained in the file group of the owner, the accessed file can be downloaded and/or streamed without restraint for reproduction; if the file is not contained in the file group of the owner, a part of the accessed file can be streamed for reproduction.

SUMMARY OF THE INVENTION

Regardless of package media business, such as CD and DVD, or network business, such as EMD (Electronic Music Distribution), the user passively views/listens the above-mentioned various kinds of content, such as music and video. Demands by the user have been increasing, supported by the recent advance in digital technologies, for personalizing the above-mentioned various kinds of commercial content (content for commercial use, content for sale, and professional content) by executing arrangement, tempo changes, and equalization, for example, on the user side. However, at the present moment, the personalization of commercial content can be practiced by enthusiasts, most of general users being excluded. At the same time, there has been no system, at least to the knowledge of the applicant hereof, that provides both the content provider side and the user side with benefits with respect to copyright issues and so on.

Therefore, the present invention addresses the above-identified and other problems associated with related-art methods and apparatuses and solves the addressed problems by providing a data distributing system, a data distributing method, a server, and a terminal device. The present invention allows the user to change or modify commercial content in a manner of arrangement for example, provides the arranged content to other users, and benefits both the content provider side and the user side with respect to copyright issues and so on.

According to an embodiment of the present invention, the present invention provides a data distributing system for transmitting and receiving data between a terminal device and a server via a network. In this data distributing system, the server stores, for content data, additional data for modifying the content data or new content data obtained as a result of the modification. In response to download and/or stream-reproduction of the additional data and the new content data from the server by the terminal device, the server executes at least one of settlement processing and value point granting processing with respect to the additional data or the new content data.

The above-mentioned content data is at least one of video data, photographic data, music data, audio data, game data, electronic book data, and program data. The above-mentioned modification is at least one of image modification, image special effects application, image partial extraction, color modification, brightness modification, tempo modification, rhythm modification, melody modification, sound source modification, sound material modification, character modification, and contents modification with respect to the content data.

The above-mentioned additional data may be the data different from the above-mentioned content data, the data for converting the above-mentioned content data, and the data that can be created by the user in a variety of manners.

The above-mentioned settlement processing is executed by means of at least one of credit card, bank transfer, postal transfer, electronic money, micro payment, and Web money.

As described above and according to embodiments of the invention, the user can use not only materials (or content data) themselves, such as music and movies, but also arrangements obtained by modifying or changing these materials. The information (or additional data) for making arrangements and arrangement results (or new content data) can be stored in a server. Every time the additional data or the new content data is downloaded from the server and/or stream-reproduced by the user, settlement processing and/or value point granting processing is executed for a content data owner and/or rights holder and a creator of the additional data or the new content data. This configuration will contribute to the development of the content industry, give users incentives, accelerate the forming of communities, and expand of personal content. This will significantly enhance copyright protection and contribute to the sales of material.

DETAILED DESCRIPTION OF THE PREFERRED EMBODIMENTS

This invention will be described in further detail by way of embodiments thereof with reference to the accompanying drawings.

In one embodiment of the invention, it is assumed that original commercial content data, such as video and music, be changed or modified (or arranged), in which new content data obtained by arranging original content data by professional or amateur users as desired or arrangement data (or additional data or data for arrangement) for generating new content data is uploaded, transmitted, and recorded to servers for example through a network. Now, let an owner of original commercial content data be A and a creator of arrangement data be B. These owner A and creator B may one or more natural persons or corporate persons. Next, when the new content data or the arrangement data (additional data) is downloaded or reproduced by others or retransmitted or re-recorded to others, the settlement accounts is executed on owner A and/or creator B by means of accounting requiring owner A and/or creator B to pay the copyright fee, royalty, or usage fee in the broad sense of the term. In this settlement of accounts by means of accounting, a monetary payment (including substitutions of compensation such as token and coupon for example) such as payback is executed. To be more specific, the monetary payment is at least one of payments by credit card, bank transfer, postal transfer, electronic money, micropayment, and Web money (or electronic money of prepaid card type). Instead of the above-mentioned settlement by means of accounting or at the same time as the execution of settlement, a value point (including the number of times download or access has been made or the ranking by vote, for example) may be granted as a point indicative of social value or credit. This point (or value point) is also referred to as coupon, virtual money, or local currency that substantially has the value of normal currencies that can be turned into money or goods. Execution of the above-mentioned settlement and/or value point granting makes not only the arrangement data creator but also the original content copyright holder expect returns, thereby accelerating the forming of communities.

The above-mentioned content data is at least one of video data, photographic data, music data, audio data, game data, electronic book data, and program data. The above-mentioned change (or arrangement) includes at least one of change in image, image effects, image partial extraction, image tone change, image brightness change, music tempo change, music rhythm change, music melody change, sound source change, tone material change, character change, and contents change with respect to the above-mentioned content data. The above-mentioned additional data (or arrangement data) may include data different from the above-mentioned content data and data for executing conversion on the above-mentioned content data or data created by the user in a variety of manners.

Figure 1:
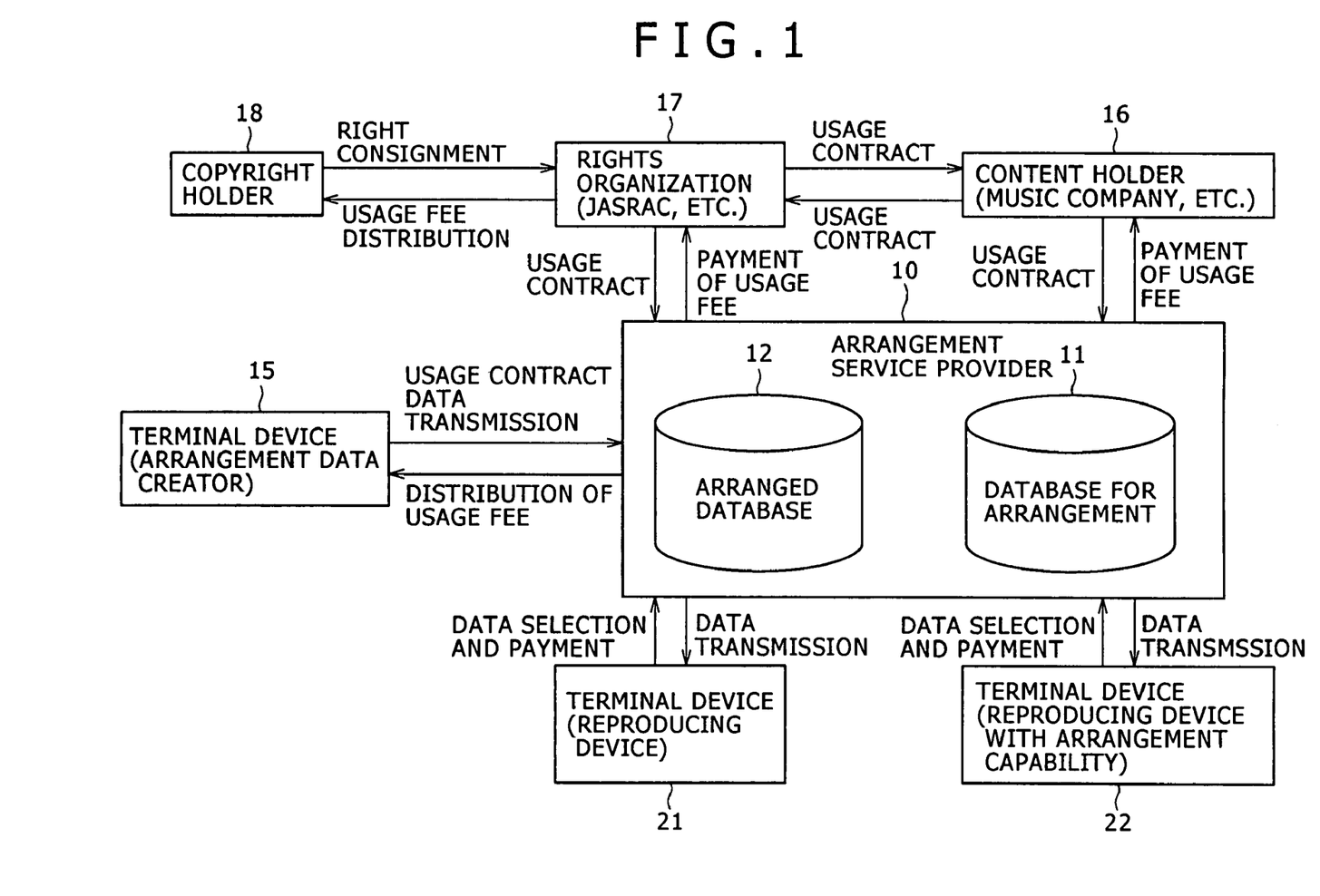
FIG. 1 is a block diagram illustrating an exemplary overview configuration of a data distribution system practiced as one embodiment of the invention.

Now, referring to FIG. 1, there is shown an exemplary overview configuration of a data distributing system practiced as one embodiment of the invention.

As shown in FIG. 1, in order to provide additional data (or arrangement data) for arranging content created by the user for example and new arranged content data, an arrangement service provider (or a server) 10 has a database 11 storing arrangement data (or additional data) and a database 12 storing new arranged data (or new content data) obtained by arranging original content.

By contracting the service by providing (or uploading) arrangement data from a terminal device, 15 for example to the arrangement service provider 10, the arrangement data creator gets the allotment of usage fee from the arrangement service provider 10 of the usage of the arrangement data or the arranged data.

On the basis of the contract of the service provided by a content holder 16 such as a music providing company (or a recording label) or a rights organization 17 such as JASRAC (Japanese Society for Rights of Authors, Composers and Publishers),. the arrangement service provider 10 pays, to the content holder 16 or the rights organization 17, the fees of usage of the arrangement data or arranged data obtained by modifying the content provided by these entities. A copyright holder 18 such as a lyrics writer for example places its copyright in the charge of the rights organization 17, thereby getting the allotment of usage fees.

In reproducing content data on a terminal device 21 as a normal reproducing device, each general user selects desired arranged data (or new content data) and pays the usage fee to the arrangement service provider 10, upon which the selected arranged data is read from the database 12 storing arranged data and transmitted to the terminal device 21. A control block (not shown) by the arrangement service provider 10 executes these usage fee distribution process, value point granting processing, and transmission and reception of data with the terminal device.

If a terminal device 22 that is a reproducing device having an arrangement capability for modifying original content on the basis of the above-mentioned arrangement data (or additional data) and a kind of generator capability (or a capability of generating new content) is used, desired arrangement data may be supplied from the arrangement service provider 10. When desired arrangement data (or additional data) is selected and a usage fee thereof is paid to the arrangement service provider 10, the arrangement service provider 10 reads the selected arrangement data from the database 11 storing arrangement data and transmits the selected arrangement data to the terminal device 22 that is a reproducing device having an arrangement capability. The terminal device 22 gets original content data from a recording media such as CD or DVD or downloads original content data via a network, executes an arrangement on the obtained original content data by use of the arrangement data or modifies the original content data with the additional data to generate new content, and stores or reproduces the generated new content.

It should be noted that the transmission and reception processing of original content that is executed in the example shown in FIG. 1 is substantially the same as with general content, so that the transmission and reception processing is not illustrated and the description thereof is skipped.

Figure 2:
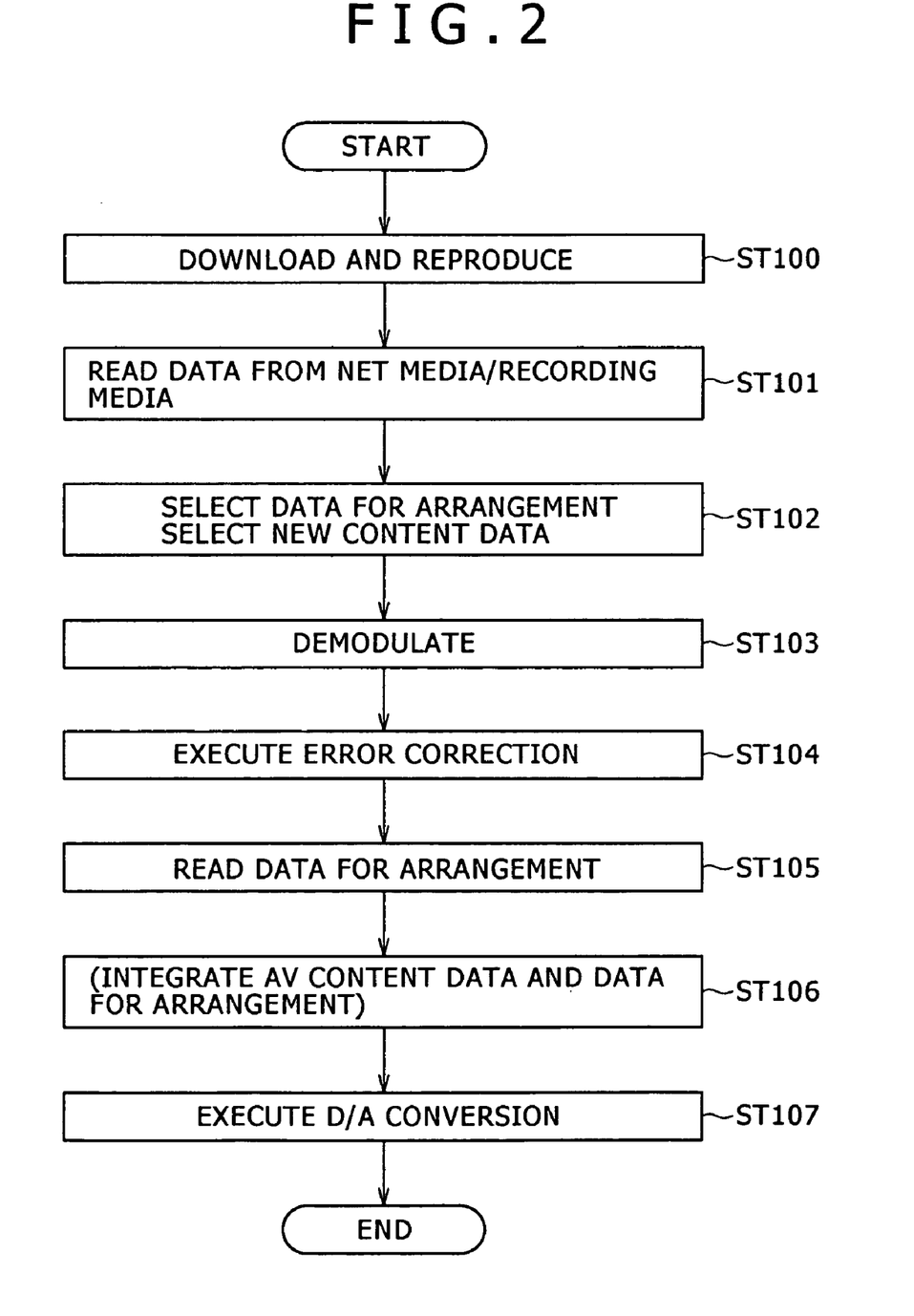
FIG. 2 is a flowchart indicative of a general operation to be executed when downloading new arranged content data or data for arrangement.

The following describes a general operation to be executed when downloading and reproducing (including streaming reproduction) the above-mentioned arranged data (or new content data) or arrangement data (or additional data), with reference to the flowchart shown in FIG. 2. The example shown in FIG. 2 includes not only a case in which transmission and reception of data via network but also a case in which data is reproduced by use of recording media such as CD and DVD.

Referring to FIG. 2, in the first step ST100, a download/reproduction operation is executed for downloading/reproducing new arranged content or arrangement data. In step ST101, data is read from net media/recording media. In step ST102, arrangement data is selected or new content data (or arranged content) is selected. The arrangement data or new content data is encoded in general. In ST103 and ST104, the encoded data is decoded, to be more specific, demodulated and error-corrected. In step ST105, the decoded arrangement data or new content data is taken out. If arrangement data is selected in step ST102, then the arrangement data is integrated with original AV content data in step ST106, namely, the original content data is modified (or arranged) by the arrangement data. Then, the procedure goes to step ST107. If new content data is selected in step ST102, the procedure goes to step ST107 by skipping step ST106. In step ST107, the new arranged content data is D/A-converted (From digital to analog) and the AV content is reproduced in a viewable form. Alternatively, the new content data may be stored.

Figure 3:
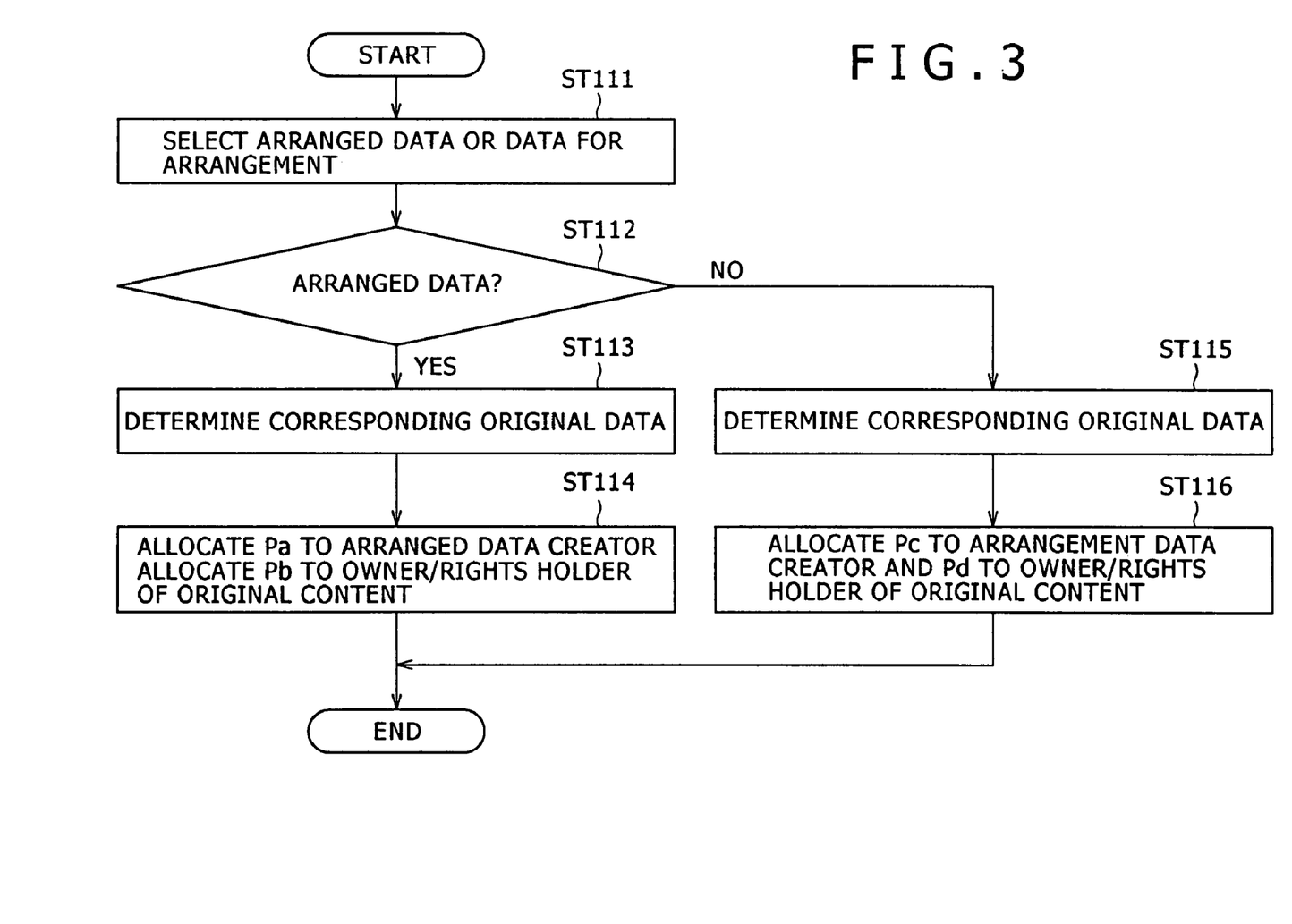
FIG. 3 is a flowchart indicative of accounting processing to be executed when downloading new arranged content data or data for arrangement and an operation of granting points (or value points) indicative of social value or credit.

The following describes the accounting to be executed when downloading/reproducing the above-mentioned new arranged content data or arrangement data and the granting of points (or value points) indicative of the social value or credit of the user, with reference to the flowchart shown in FIG. 3.

In step ST111 shown in FIG. 3, the user selects desired arranged data or arrangement data and downloads/reproduces the selected data from the arrangement service provider 10. In step ST112, it is determined whether the selected data is arranged data (or new content data). If the data is found to be arranged data (YES), then the procedure goes to step ST113 to determine the corresponding original content data. In step ST114, the settlement by billing amount Pa to the creator of the arranged data and amount Pb to the owner/rights holder of the original content is executed and a point indicative of social value and credit is granted. If the decision is NO (indicating that the data is not arranged data but arrangement data) in step S112, then the procedure goes to step ST115 to determine the corresponding original content data. In step ST114, the settlement by billing amount Pc to the creator of the arrangement data and amount Pd to the owner/rights holder of the original content is executed and a value point is granted.

The above-mentioned amounts of money (or the number of value points) Pa, Pb, Pc, and Pd may have a following relationship, for example:

$$Pa<Pb, Pc>Pd, Pa\leq Pc, Pb>Pd.$$

The above-mentioned settlement and value point granting may be executed in various methods. The following describes some specific examples.

(1) In the arrangement service provider 10, the number of times downloads have been made on each terminal device is counted and the obtained count is multiplied by the above-mentioned amounts (or the number of value points) Pa, Pb, Pc, and Pd.

(2) In the arrangement service provider 10, a monthly usage fee is set, the total is allotted by a ratio of download count, and the resultant allotment is further allotted by a predetermined ratio of allotment (for example, Pa to Pb in the case of arranged data, Pc to Pd in the case of arrangement data).

(3) In the case of a device as with the terminal device 22 capable of modifying (or arranging) original content by use of arrangement data to generate new content, the count may be made every time new content is generated by use of arrangement data to use the resultant count in the above-mentioned allotment calculation.

(4) As will described later, with so-called P2P systems, counting may be executed every time arrangement data or arranged data (or new content) is transmitted and received between terminal devices, thereby using the obtained count for the above-mentioned allotment calculation. It should be noted that, in this case, the transfer of the arranged data is permitted by the copyright holder of the original content.

As described above, according to one embodiment of the present invention, a data base (or the arrangement service provider 10) connected via network provides the arrangement data or arranged data (or new content) for user-desired AV content data. The arranged data (or new content) is reproduced on the terminal device 21 of the user or the AV content data is arranged by use of the arrangement data on the terminal device 22. Therefore, the user can enjoy music, video, CG, game, and electronic book in a variety of forms reproduced by the user-prepared arrangement data as an AV content data reproducing environment.

For a specific example of the above-mentioned arrangement data, an example disclosed by the specification and accompanying drawings of Japanese Patent Application No. 2005-038582 previously file by the applicant hereof may be used, for example.

Figure 4:
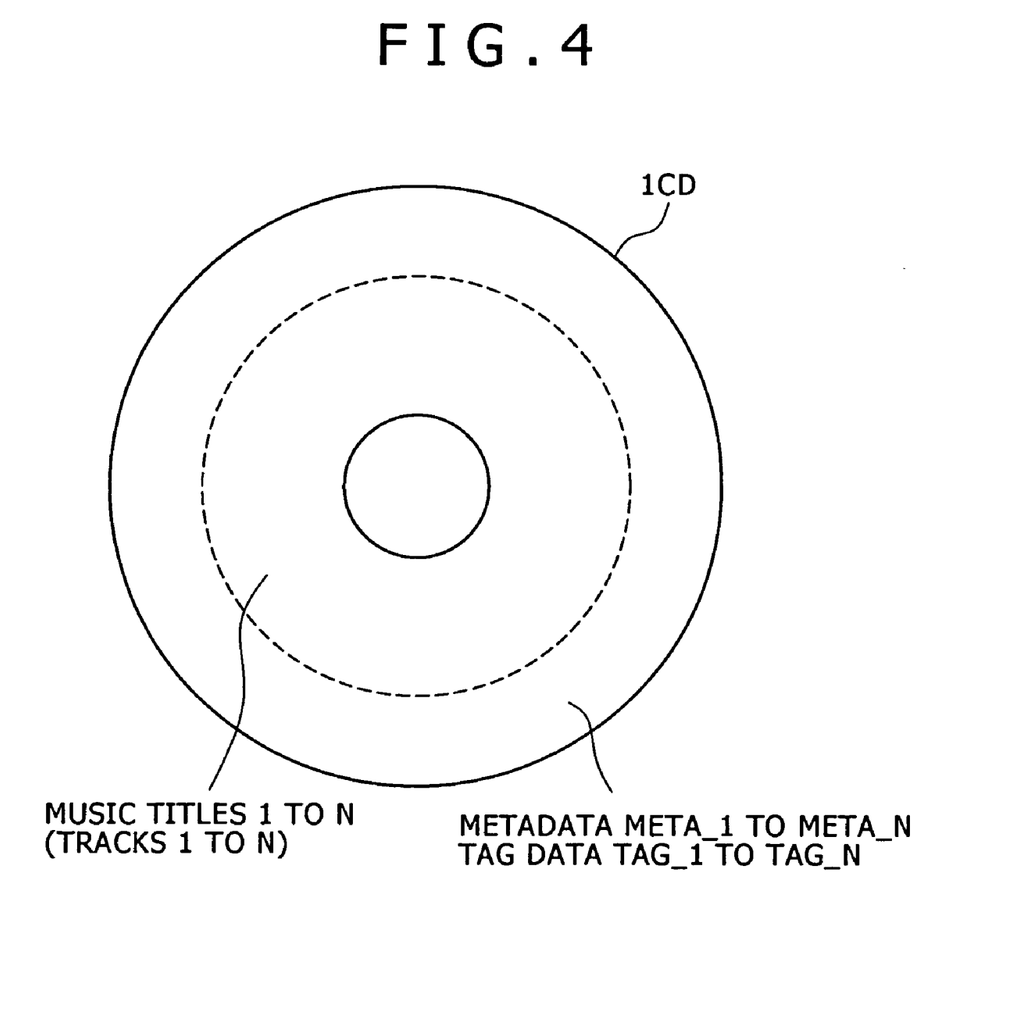
FIG. 4 is a schematic diagram illustrating one example of a recording media (CD) to which original content and data for arrangement to be used for the description as one embodiment of the present embodiment are recorded.

To be more specific, FIG. 4 shows an example of contents of recording and a recording format when a CD is used for a recording media, to which music data as original content and arrangement data are recorded.

In the example shown in FIG. 4, CD1 has CD Extra format and the digital audio data (or uncompressed digital audio data) of music titles 1 to N is recorded, as tracks 1 to N, to the first session as a plurality of pieces of original content. In this case, the digital audio data in tracks 1 to N is recorded in the same format as the music data in an ordinary CD-DA (Digital Audio).

N sets of metadata META_1 through META_N and tag data TAG_1 through TAG_N are recorded to the second session of CD1 as arrangement data. In this case, metadata META_i gives a modification (or an arrangement) to music title (or track) i that is the corresponding original content. For example, in the case of an arrangement in which a guitar accompaniment is given to music title i is added, metadata META_i is the data for generating digital audio data of a guitar accompaniment.

For metadata META_i, the following data or information may be used: digital audio data that is a difference between digital audio data of music title i and digital audio data obtained by arranging the digital audio data of music title i;

data for giving modifications to the time axis, frequency axis, or level of music title i, for example, data for modifying tempo, pitch, or volume; or information configuring music title i, namely, time information indicative of the beginning of each bar or chord information in each bar, for example. It should be noted that this metadata META_i includes synchronization data for providing synchronization with music title i or address data indicative of a position corresponding to music title i.

Tag data TAG_1 through TAG_N provide information for making tracks (or music titles) 1 through N recorded to the first session correspond to or associate with metadata META_1 through META_N. Tag data TAG_1 through TAG_N are used to find which of metadata META_1 through META_N corresponds to which of music titles 1 through N.

Figure 5:
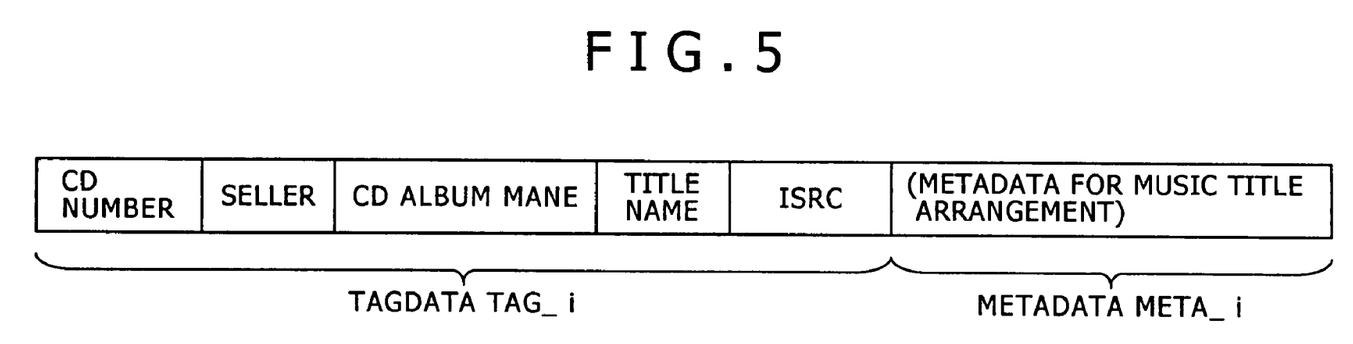
FIG. 5 is a diagram illustrating one example of a format of the data for arrangement recorded to the recording media (CD) shown in FIG. 4.

For example, in the case of the specific example shown in FIG. 5, tag data TAG_i (i=1 to N) has the CD number, label company (or seller), album name, music title of track i, and ISRC (International Standard Recording Code) of this CD1. This tag data TAG_i is followed by metadata META_i.

According to the above-mentioned CD1, music title i in the first session is associated with metadata META_i in the second session through tag data TAG_i, so that music title i can be modified (or arranged) by use of metadata META_i. In addition, preparing a plurality (M) of metadata META_ij (j=1 to M) for one music title i allows the user to listen to the same music title i with any of M different arrangements 1 through M. In this case, as will be described later, combination use of arrangements can be realized.

Further, according to this CD1, the user can listen to music title i in an unarranged status, thus using CD1 as a single unit as with ordinary CDs. In addition, music title i, metadata META_i, and tag data TAG_i of CD1 can be moved to a hard disk drive of a personal computer and used thereon, for example. Moreover, in the case of a listener who has already purchased music title i can get metadata META_i and tag data TAG_i of arrangement data created by others through the Internet or home pages or distribute or sell metadata META_i and tag data TAG_i of arrangement data created by himself through the Internet or his home page.

It should be noted that tag data TAG_i and metadata META_i can be contained in the TOC (Table Of Contents) of CD or a text part of CD text as a part of fringe data, for example.

In the above-mentioned example, data to be arranged is music data. Embodiments of the present invention are not limited to music data; for example, video and image data, such as movies, television broadcasts, and games, can be arranged.

Figure 6:
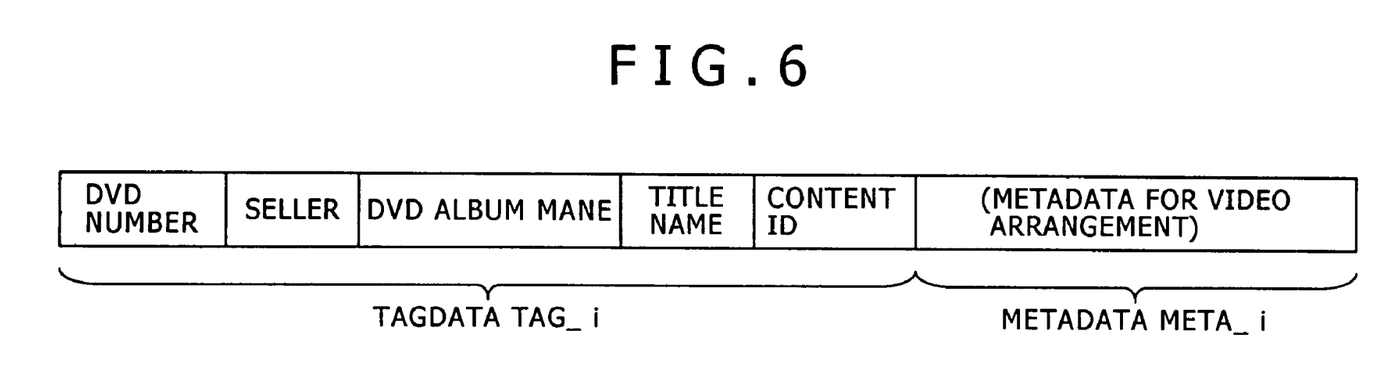
FIG. 6 is a diagram illustrating one example of a format of the data to arrangement recorded to another recording media (DVD)

For example, FIG. 6 shows an example of a format of metadata META_i and tag data TAG_i for use in arranging video recorded to a DVD that is used in place of the above-mentioned CD. In the example shown in FIG. 6, tag data TAG_i contains data including DVD number, label company, album name, title name, and content ID, approximately as with the format shown in FIG. 5.

Tag data TAG_i is followed by metadata META_i. Arrangements based on this metadata META_i include, in the case of real images and video and CG-based character animations, such filter processing for a part or all of screen or a particular object as color correction, edge enhancement, noise addition, tone change and manipulation, display area change by zoom and pan, text and graphics superimposition, scene extraction and insertion, composition with other video and image, and reproduction speed change, for example. Especially, in the case of character animations, the arrangements by metadata META_i can additionally include the changes of animation curves (or values corresponding to key frames) acting on spatial position, shape, and material, changes of texture, and, in case of 3D CG, changes of light source parameters and addition and change of fog.

As compared to the above-mentioned arrangements on music content, it may be correspondence between music reproduction tempo and image reproduction speed, music pitch and image color and shape, music tone and image tone, and musical instrument tone and CG character image shape and color, for example.

Therefore, these metadata META_i and tag data TAG_i allow the user to arrange corresponding video and image data.

Figure 7:
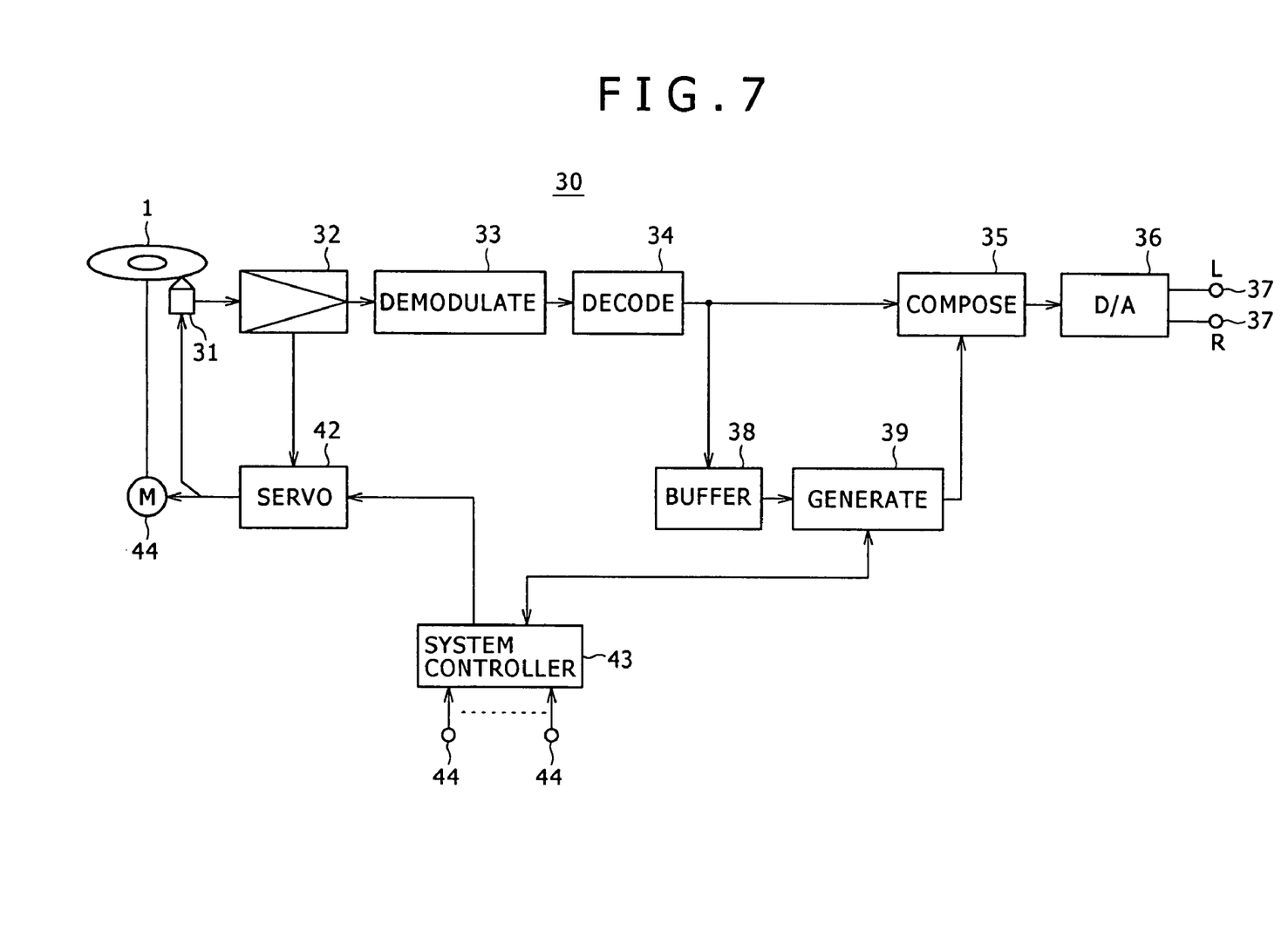
FIG. 7 is a block diagram illustrating one example of a reproducing apparatus for reproducing the recording media shown in FIG. 4.

Referring to FIG. 7, there is shown a block diagram illustrating one example of a reproducing device for reproducing CD1 having the above-mentioned recording format. In the reproducing device 30 shown in FIG. 7, CD1 is rotated by a spindle motor 41 at a predetermined speed, an EFM signal is reproduced from CD1 through an optical head 31, and the reproduced EFM signal is taken out through a reproduction amplifier 32.

Then, this EFM signal is supplied to a servo circuit 42, a resultant servo output is supplied to the spindle motor 41 to control CD1 at a predetermined speed, and another servo output is supplied to the optical head 31 to execute sled servo, tracking servo, and focus servo on CD1. It should be noted that a system controller 43 based on a microcomputer controls the reproduction of CD1. For example, when the user operates an operator button 44, a desired track is selected from among tracks (or music titles) recorded to CD1.

By use of a recording device as shown in FIG. 7, normal reproduction (the reproduction of original content) and reproduction added with accompaniment (the reproduction of new arranged content) are executed as described below.

In the case of normal reproduction, an EFM signal taken from the reproduction amplifier 32 is supplied to an EFM demodulator 33, through which an original encoded signal of music title i is demodulated, the demodulated signal is supplied to a decoder 34 for error correction, and the original digital audio data is decoded. The decoded digital audio data is supplied to a D/A converter 36 through a composer 35 to be described later to be converted into analog audio signals L, R, which are outputted at an output terminal 37.

Consequently, music title i recorded to the first session of CD1 can be reproduced as usual.

The following describes the reproduction of an arrangement as described above, for example, the reproduction of an arrangement obtained by adding an accompaniment to a music title of original content.

In this case, of the metadata and tag data recorded to the second session, metadata META_ij and tag data TAG_i corresponding to the j-th arrangement of desired music title i are reproduced and the reproduced data are taken from the decoder 34, taken out metadata META_ij and tag data TAG_i being supplied to a buffer 38 to be stored.

Next, as with the above-mentioned usual reproduction, the digital audio data of desired music title i are taken from the decoder 34 to be supplied to the composer 35. At this moment, metadata META_ij stored in the buffer 38 is taken in synchronization with the digital audio data of music title i taken from the decoder 34. It should be noted that tag data TAG_i is used for this synchronization.

Then, metadata META_ij taken from the buffer 38 is supplied to a generator 39. The generator 39, based on a DSL (Digital Signal Processor) for example, generates the digital audio data of an accompaniment of music title i from metadata META_ij (j=1 to 3) supplied to the generator 39. For example, if metadata META_i1 is data for adding a guitar accompaniment to music title i, the generator 39 generates the digital audio data for the guitar accompaniment.

It should be noted that, when the user operates the operator button 44, the system controller 43 controls the generator 39 to select metadata META_ij, thereby generating the digital audio data of an accompaniment indicated by the selected metadata.

If, of metadata META_ij, the selected metadata contains data for changing or specifying a tempo, then the data indicative of the a tempo is supplied to the system controller 43. As a result, the system controller 43 controls the servo circuit 42 to change the speed of CD1, thereby changing the speed (or tempo) of the digital audio data to be reproduced from CD1.

Next, the accompaniment digital audio data generated by the generator 39 is supplied to the composer 35 to be combined with the digital audio data of original music title i. It should be noted that, if the speed (or tempo) of the digital audio data to be reproduced from CD1 is changed as described above, the tone interval of music title i changes accordingly, so that the changed tone interval is restored to the original tone interval in the composer 35. Obviously, the original tone interval may be restored as a result of arrangement or the tone interval may be increased or decreased. Therefore, the composer 35 can be an arranger circuit for executing arrangements on original music title i.

Thus, the digital audio data of music title i arranged in accordance with metadata META_ij is taken from the composer 35 and analog audio signals L, R thereof are outputted to the output terminal 37.

Consequently, according to the reproducing device 30, CD1 can be reproduced with an accompaniment resulted from the arrangement. At this moment, if a plurality of metadata META_ij are prepared for one music title i, the user can listen to the same music title with different arrangements.

In the above-mentioned embodiment, one item of metadata is selected from a plurality of items of metadata META_ij. However, the embodiment is not limited to this configuration; for example, an arrangement may be made by combining a plurality of items of metadata. For example, an arrangement may be made in which a bossa nova guitar accompaniment is added on the basis of metadata META_i1, the reproduction tempo is increased by 10% on the basis of metadata META_i2, and the tone interval of the music title is increased by three degrees over the original tone interval on the basis of metadata META_i3.

Figure 8:
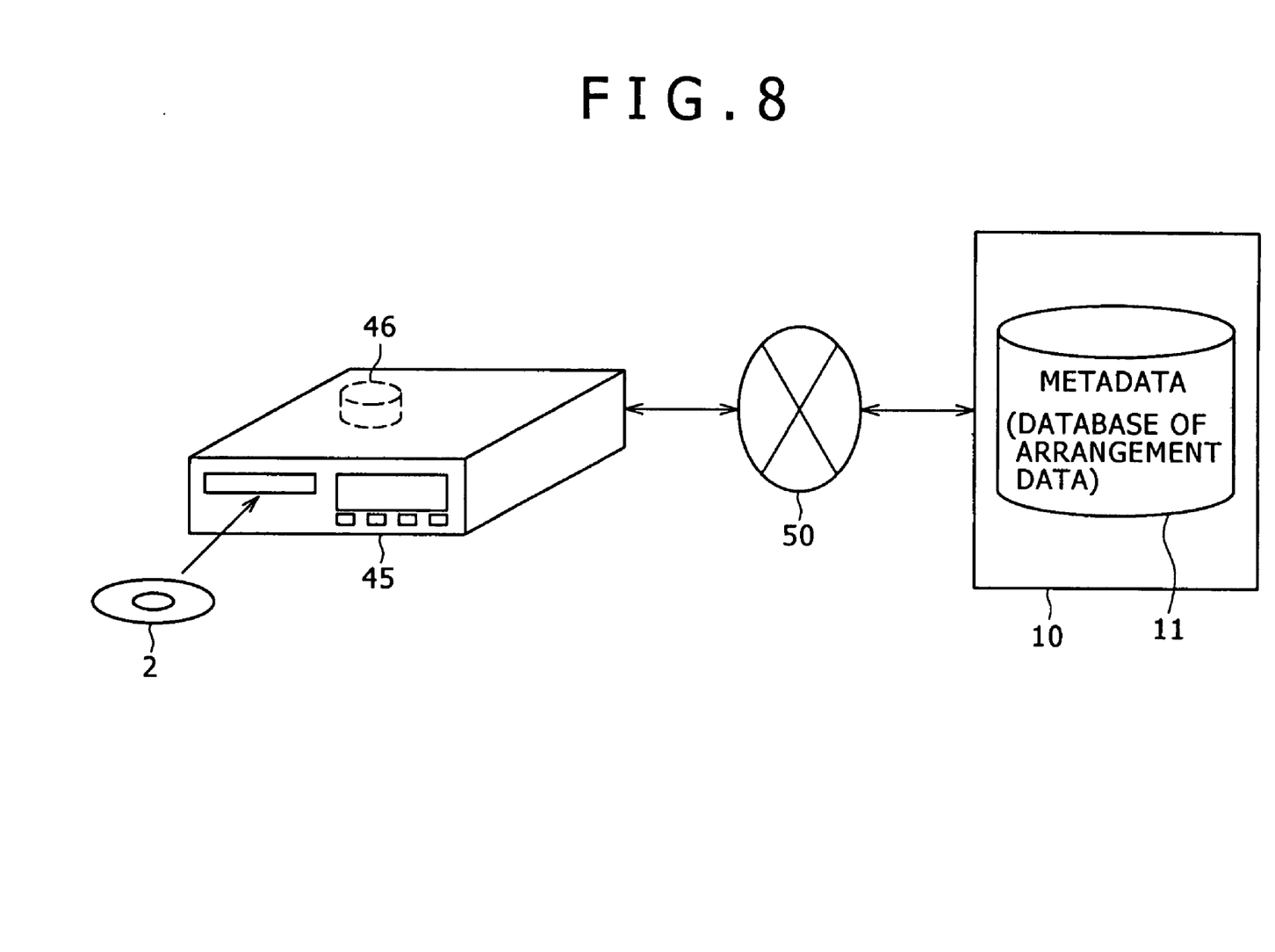
FIG. 8 is a schematic diagram illustrating an exemplary overview configuration of an arrangement service provider and a reproducing apparatus (or a CD player) having an arrangement capability, practiced as one embodiment of the invention.

FIG. 8 shows one example in which the arrangement service provider 10 as described with reference to FIG. 1 for example is used as a database server. In this example, music title i as original content is reproduced from ordinary CD2 and metadata META_i and tag data TAG_i of that music title i are accommodated in the database 11 for the metadata (or the arrangement data) of the arrangement service provider 10 for example that is a database server, thereby using the stored metadata and tag data through a network. To be more specific, the arrangement service provider 10 has the database 11, in which metadata META_1 through META_N and tag data TAG_1 through TAG_N of music titles 1 through N are stored.

Hence, a dedicated CD player 45 is disposed for reproducing CD2. The CD player 45 has a signal system as shown in FIG. 7 for example and hard disk drive 46 and communications capabilities. The CD player 45 is equivalent to the terminal device 22 that is a reproducing device having the arrangement capabilities shown in FIG. 1. The CD player 45 is connected to the arrangement service provider 10 functioning as a server via the Internet 50 for example. It should be noted that CD2 is a usual CD-DA.

Figure 9:
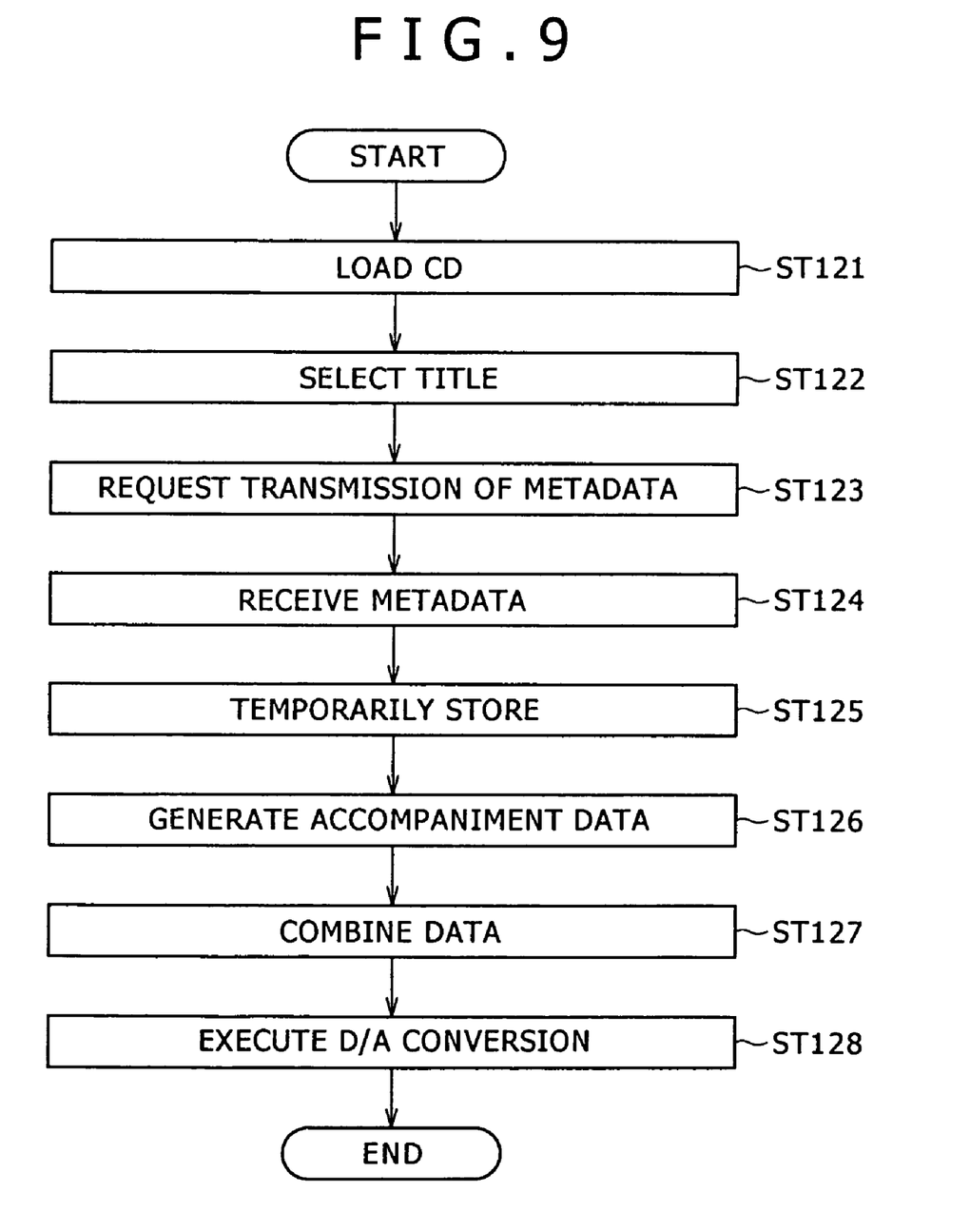
FIG. 9 is a flowchart indicative of a reproducing operation in the configuration shown in FIG. 8.

FIG. 9 is a flowchart indicative of a procedure of operations and processing to be executed when reproducing content data by use of the CD player 45 (a communications terminal device providing a reproducing device having arrangement capabilities).

Referring to FIG. 9, when CD2 is loaded on the CD player 45 (step ST121) and a title is selected (step ST122), CD number and track number data are read from CD2 to be transmitted to the arrangement service provider 10 via the Internet 50, upon which the arrangement service provider 10 is requested to return metadata META_i and tag data TAG_i of corresponding music title i (step ST123).

As a result, the arrangement service provider 10 corresponding metadata META_i and tag data TAG_i from the database 11 and transmits these data to the CD player 45 via the Internet 50. It should be noted that, in this case, if there are a plurality of metadata META_i for music title i, all or user-specified metadata META_i can be downloaded.

Then, transmitted metadata META_i and tag data TAG_i are received by the CD player 45 (step ST124) to be temporarily stored in the hard disk drive 46 (step ST125). Next, the digital audio data of the title selected in step ST122 is reproduced from CD2 to be supplied to the composer 35 and, at the same time, the metadata META_i and tag data TAG_i stored in the hard disk drive 46 are supplied to the generator 39 (FIG. 6). The generator 39 generates the digital audio data for the accompaniment of music title i (step ST126), supplying the generated digital audio data to the composer 35.

Next, the composer 35 combines the digital audio data of the supplied original music title with the accompaniment digital audio data supplied from the generator 39 (step ST127). It should be noted that tag data TAG_i is used for the synchronization of this composition.

Thus, the digital audio data of music title i arranged on the basis of metadata META_i is taken from the composer 35, the digital audio data is supplied to the D/A converter 36 to be converted into analog audio signals L, R (step ST28), which are outputted to the output terminal 37.

Consequently, the CD player 45 can reproduce usual CD2 with an accompaniment.

Figure 10:
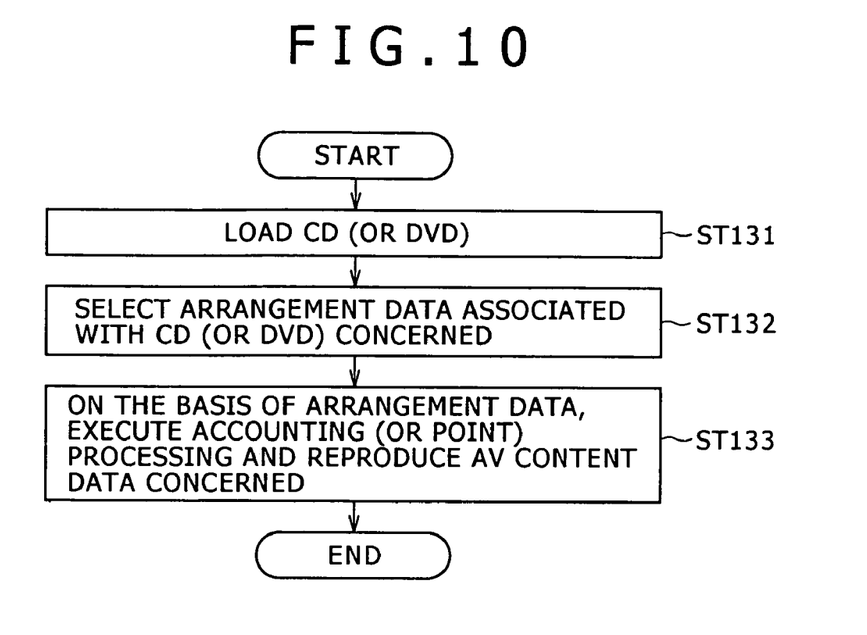
FIG. 10 is a flowchart indicative of accounting (point) processing to be executed when the reproducing operation in the configuration shown in FIG. 8 is executed.

FIG. 10 is a flowchart indicative of accounting to be executed when reproducing content data by use of a reproducing device having arrangement capabilities (the terminal device 22 shown in FIG. 1) such as the above-mentioned CD player 45.

In FIG. 10, a CD (or a DVD for example) is loaded on the device in step ST131. In step ST132, arrangement data associated with the loaded CD is selected. In step ST133, accounting (or the above-mentioned point processing for granting value points) is executed on the basis of the selected arrangement data and the AV data recorded to the loaded CD (or the DVD) is reproduced while changing (or arranging) the AV data by use of the selected arrangement data. Alternatively, the new content data changed (or arranged) by the arrangement data may be stored. For the amount of money (or the number of value points) accrued in this case, settlements or value point granting of Pc to the arrangement data creator and Pd to the original content owner/rights holder is executed.

It should be noted that the user of each terminal device is able to create the arrangement data for arranging content data and provide the created arrangement data or the created new content data to the server.

Figure 11:
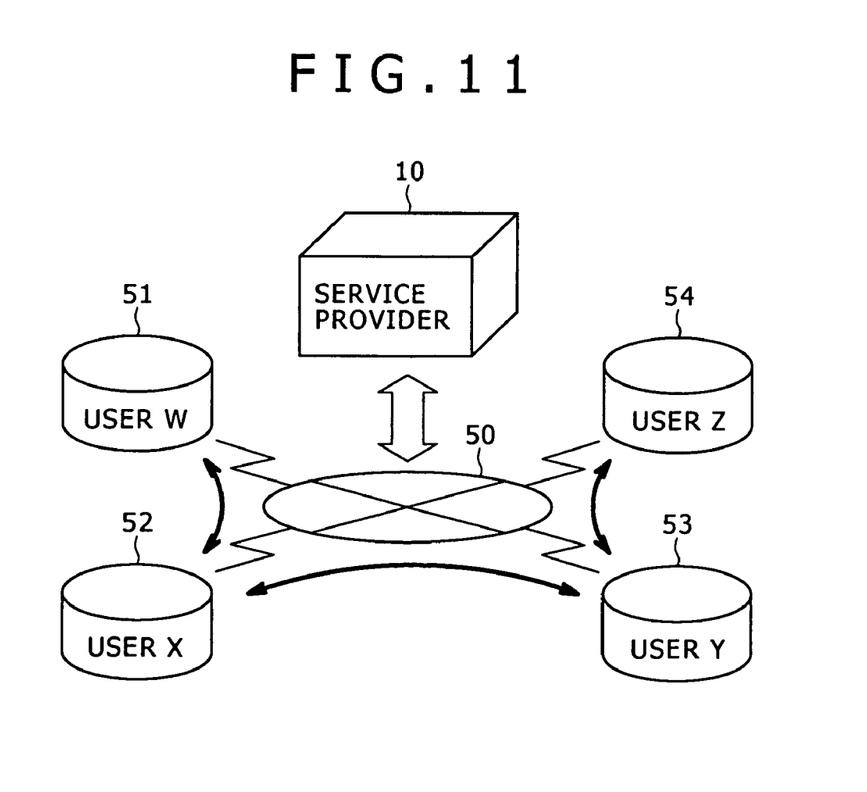
FIG. 11 is a schematic diagram illustrating a plurality of terminal devices connected to an arrangement service provider via a network in the above-mentioned one embodiment of the invention.

In the embodiment shown in FIG. 1, the arrangement service provider 10 and the terminal devices 15, 21, and 22 are interconnected via a network. To be more specific, the arrangement service provider 10 is connected to the Internet 50 to which a plurality of terminal devices 51 through 54 are connected as shown in FIG. 11. These terminal devices 51 through 54 are equivalent to the terminal devices 15, 21, and 22 shown in FIG. 1.

In a data distributing system as shown in FIG. 11, the terminal devices 51 through 54 are capable of getting new content data or arrangement data from the arrangement service provider 10 and exchanging data between the terminal devices 51 through 54.

For example, let users of the terminal devices 51 through 54 be W, X, Y, and Z, and the terminal device 51 hold arrangement data W1, W2, and W3 created by user W, the terminal device 52 hold arrangement data X1 and X2 created by user X, the terminal device 53 hold arrangement data Y1, Y2, Y3, and Y4 created by user Y, and the terminal device 54 hold arrangement data Z1 created by user Z. The arrangement data of these users W, X, Y, Z are exchangeable therebetween. Every time a user transfers the arrangement to another, the settlement of amount of money and value point granting Pc is given to the creator of the transferred arrangement data and Pd is given to the owner/rights holder of the original content. Each terminal device functions in substantially the same manner as the arrangement service provider 10 or as a part thereof. In order to execute the settlement of amount of money and value point granting also in the exchange of data between terminal devices as described above, it is preferable that a data exchange situation be reported to the arrangement service provider 10 and other servers to make these servers collectively manage the above-mentioned settlement and value point granting processing.

It is also practicable that the terminal devices 51 through 54 each have a category ID, thereby exchanging arrangement data between the terminal devices having the same category ID. In this case, the forming of communities of users having same preferences may be accelerated by granting points to the creator of arrangement data every time the arrangement data is transmitted. Obviously, monetary accounting may also be executed for the creator of the arrangement data.

It should be noted that, in the description of the above-mentioned embodiment, the exchange and/or distribution of arrangement data for use in modifying original content, such as music data, is used. It is also practicable that the arrangement data act on a part of original content. To be more specific, in the case of music, for example, arrangement data for preview may be prepared to arrange the beginning or bridge (characteristic part) of a music title. Consequently, the user can preview the content arranged by the arrangement data created for preview before purchasing or distributing the arrangement data that acts on the entire content. As a result of preview, the user can determine whether to purchase or get the entire arrangement data.

Further, it is also practicable to arrange, by use of a piece of arrangement data, new content data already arranged by use of another piece of arrangement data, thereby providing the re-arranged content data and the arrangement data used in arranging the re-arranged content data.

The arrangement data exchanging, distributing, accounting, and/or point-processing system having the above-mentioned embodiment of the present invention allows the user to actively enjoy music and movies for example and provides means for giving returns to content copyright holders and content creators, thereby presenting high possibilities of gaining popularity. Also, this system may help form kind of communities of people of similar presence, a jazz community, a classical music community, a tempo community, an arrangement community, and filksong (lyrics) community, for example. Further, this system has possibilities of application for world sport championship and, in which favorite team communities and national team support communities, for example, may be formed.

According to the embodiments of the invention, each user can enjoy such materials (content data) themselves as music and video as well as arrangements obtained by modifying these materials by the user. In addition, providing the information about arrangements made by the user to others allows them to also enjoy the arrangements. Alternatively, it is practicable to store the information about arrangements in server to distribute the information through portal or P2P services, thereby providing a variety of forms of content data usage, such as user's acting on content materials, for example.

Moreover, the information about arrangements becomes significant only when the user who uses this information prepares materials, thereby significantly enhancing copyright protection and contributing the sales of material.

Further, in the above-mentioned embodiments of the invention, the user uploads additional data and arrangement data created by himself, exchanges these data through P2P, and stores these data in recording media such as optical disk, HDD, and memory for example, and distribute these data as desired for marketed AV content data such as CDs and DVDs, or so-called professional content. Consequently, the above-mentioned embodiments allow the user to give various added values to professional content for extended use and enjoyment thereof. The additional data may be the spatial characteristics of theater, hall, live venue, church, and outdoors, for example. Since recording media contain various user-created additional data and arrangement data, the user can select any desired user-created additional data from AV sources to enjoy music and movies in a variety of situations. Besides, the above-mentioned embodiments have the above-mentioned mechanism for monetarily (including value point granting) compensating owner A of the original content on the basis of which arranged content has been made and creator B who has made such an arrangement. This configuration will profit the content industry itself, such as music companies, movie companies, and game companies, for example and give users incentives, thereby raising expectation for accelerating the forming of communities and the expansion of personal content.

While preferred embodiments of the present invention have been described using specific terms, such description is for illustrative purpose only, and it is to be understood that changes and variations may be made without departing from the spirit or scope of the following claims.

What is claimed is:

1. A data distributing system for transmitting and receiving data between a terminal device and a server via a network, comprising:

said server that is configured to:
store, for content data, additional data created by at least one user for modifying at least one audio or video characteristic of the content data or new content data obtained as a result of the modification by the at least one user of the content data; and
in response to download and/or stream reproduction of said additional data or said new content data from said server by said terminal device, execute settlement processing and/or value point granting processing with respect to said additional data or said new content data; and the terminal device that is configured to:
after the settlement processing and/or value point granting processing is executed and the terminal device receives said additional data created by the at least one user or said new content data obtained as a result of the modification by the at least one user of the content data, receive user input from at least one second user to create second additional data for modifying the content data or to create second new content data by modifying the new content data; and transmit the second additional data or the second new content data to the server.

2. The data distributing system according to claim 1, wherein said settlement processing and/or said value point granting processing is executed for an owner/a rights holder of said content data.

3. The data distributing system according to claim 1, wherein said settlement processing and/or said value point granting processing is executed for a creator of said additional data and/or said new content data.

4. The data distributing system according to claim 1, wherein said settlement processing and/or said value point granting processing is executed for an owner and/or a rights holder of said content data and a creator of said additional data or said content data.

5. The data distributing system according to claim 1, wherein said content data is at least one of video data, photographic data, music data, audio data, game data, electronic book data, and program data.

6. The data distributing system according to claim 1, wherein said modification is at least one of image modification, image special effects application, image partial extraction, color modification, brightness modification, tempo modification, rhythm modification, melody modification, sound source modification, sound material modification, character modification, and contents modification with respect to said content data.

7. The data distributing system according to claim 1, wherein said additional data is data different from said content data.

8. The data distributing system according to claim 1, wherein said additional data is data for converting said content data.

9. The data distributing system according to claim 1, wherein said additional data is created by the at least one user in a variety of manners.

10. The data distributing system according claim 1, wherein said settlement processing is executed by means of at least one of credit card, bank transfer, postal transfer, electronic money, micro payment, and Web money.

11. A data distributing method comprising:
storing additional data for modifying content data and new content data obtained as a result of modification of the content data, wherein the modification of the content data comprises modifying at least one of an audio characteristic and a video characteristic of the content data;
in response to download and/or stream-reproduction of said additional data, executing settlement processing and/or value point granting processing with respect to said additional data for both an owner and/or a rights holder of the content data and a creator of the additional data; and
in response to download and/or stream-reproduction of said new content data, executing settlement processing and/or value point granting processing with respect to said new content data for both the owner and/or the rights holder of the content data and a creator of the new content data.

12. A server for transmitting and receiving data with a terminal device via a network, the server comprising:
a storage block configured to store additional data for modifying content data or new content data obtained as a result of modification of said content data, wherein the modification of the content data comprises modifying at least one of an audio characteristic and a video characteristic of the content data; and
a control block configured to:
in response to download and/or stream-reproduction of said additional data from said storage block, execute settlement processing and/or value point granting processing with respect to said additional data for both an owner and/or a rights holder of the content data and a creator of the additional data; and
in response to download and/or stream-reproduction of said new content data from said storage block, execute settlement processing and/or value point granting processing with respect to said new content data for both the owner and/or the rights holder of the content data and a creator of the new content data.

13. A terminal device for transmitting and receiving data with a server via a network, wherein said terminal device:
transmits additional data for modifying said content data and new content data obtained as a result of modification of said content data to said server to store the additional data and the new content data in said server, wherein the additional data and the new content data are created by a user of the terminal device; and
in response to download and/or stream-reproduction of said additional data and said new content data from said server to another terminal device, executes settlement processing and/or value point granting processing for an owner and/or a rights holder of the content data and the user of the terminal device.

14. The terminal device according to claim 13, wherein the settlement processing comprises monetarily compensating the user of the terminal device for usage of the additional data and the new content data and monetarily compensating the owner of the content data.

15. The terminal device according to claim 13, wherein the value point granting processing comprises granting at least one value point to the user of the terminal device for usage of the additional data and the new content data and granting at least one value point to the owner of the content data.

* * * * *